(12) United States Patent
Sezai

(10) Patent No.: US 6,729,756 B2
(45) Date of Patent: May 4, 2004

(54) METHOD FOR CALIBRATING A TOTAL-POWER MICROWAVE RADIOMETER FOR A SATELLITE

(75) Inventor: Toshihiro Sezai, Minato-Ku (JP)

(73) Assignee: Japan Aerospace Exploration Agency, Tsukuba (JP)

( * ) Notice: Subject to any disclaimer, the term of this patent is extended or adjusted under 35 U.S.C. 154(b) by 0 days.

(21) Appl. No.: 10/370,725

(22) Filed: Feb. 24, 2003

(65) Prior Publication Data
US 2003/0235234 A1 Dec. 25, 2003

(30) Foreign Application Priority Data
Jun. 25, 2002 (JP) .................................. 2002-184079

(51) Int. Cl.[7] .............................................. G01K 17/00
(52) U.S. Cl. .................................... 374/2; 374/122
(58) Field of Search ................... 374/122, 1, 2, 374/175

(56) References Cited

U.S. PATENT DOCUMENTS

| | | | | |
|---|---|---|---|---|
| 3,466,654 A | * | 9/1969 | Abronson | 374/122 |
| 3,564,420 A | * | 2/1971 | Haroules et al. | 374/122 |
| 4,873,481 A | * | 10/1989 | Nelson et al. | 324/640 |
| 5,176,146 A | * | 1/1993 | Chive et al. | 374/122 |
| 6,217,210 B1 | * | 4/2001 | Roeder et al. | 374/1 |
| 2001/0019572 A1 | | 9/2001 | Roeder et al. | 374/1 |

OTHER PUBLICATIONS

I.V. Bragin et al. "On–board radiometer calibration and determination of the errors of measurement of radio–brightness temperature of the underlying surface during space monitoring of the earth," *30th European Microwave Conference –Paris 2000*, Oct. 5, 2000, pp. 203–205.

* cited by examiner

Primary Examiner—Diego Gutierrez
Assistant Examiner—Stanley J. Pruchnic Jr.
(74) Attorney, Agent, or Firm—Jacobson Holman PLLC

(57) ABSTRACT

A method for calibrating a total-power microwave radiometer for a satellite uses a cold calibration source, a hot calibration source and a receiver. The method has the steps of measuring with the receiver the brightness temperatures of the hot calibration source having a temperature of $T_{hot1}$, the hot calibration source having a temperature of $T_{hot2}$ where $T_{hot1}$ and $T_{hot2}$ are different temperatures, and the cold calibration source, calculating for these measured values the standard deviation $\Delta T_{hot1}$, $\Delta T_{hot2}$ and $\Delta T_{cold}$, and calibrating the total-power microwave radiometer for a satellite by defining the brightness temperature of the cold calibration source as:

$$T_{cold}=[(\Delta T_{hot1}-\Delta T_{cold})T_{hot2}-(\Delta T_{hot2}-\Delta T_{cold})T_{hot1}]/(\Delta T_{hot1}-\Delta T_{hot2}).$$

The method makes it possible to calibrate the colder part of the total-power microwave radiometer for a satellite frequently and accurately.

4 Claims, 4 Drawing Sheets

Radiation from Object under Observation

METHOD FOR CALIBRATING A TOTAL-POWER MICROWAVE RADIOMETER FOR A SATELLITE

BACKGROUND OF THE INVENTION

1. Field of the Invention

The present invention relates to methods for calibrating a total-power microwave radiometer for a satellite, and more particularly to a calibration method where the calibration is carried out by deriving the brightness temperature of the cold calibration source of the total-power microwave radiometer for a satellite from equations.

2. Description of Prior Art

A microwave radiometer is a measuring apparatus which measures the brightness temperature of an object by measuring the intensity of the radio wave radiated in accordance with Plank's radiation law from the object having a temperature, by receiving the radio wave whose intensity is approximately proportional to the temperature. The radio wave radiated from an object in accordance with Plank's radiation law has very weak intensity, and thus is regarded as a noise in a communication and such. A microwave radiometer is an apparatus for measuring the temperature (brightness temperature) of an object under observation from remote position, by measuring such weak intensity of the radio wave accurately. As a result, a microwave radiometer is usually equipped with a cold calibration source and a hot calibration source to be used as a standard for the intensity of the radio wave measured. Among microwave radiometers, so-called "total-power microwave radiometer" is a microwave radiometer where calibrated data is inputted by using waveguides, cables or feed horns for capturing the radio wave radiated from the object under observation into the receiver, instead of inputting the calibrated data directly to the receiver.

Many of the total-power microwave radiometers mounted on a satellite utilizes the radio wave radiated from the deep space having a temperature of 2.7K as their cold calibration source. For such total-power microwave radiometers for a satellite utilizing the radio wave radiated from the deep space as their cold calibration source, the calibration of the microwave radiometer has been carried out by employing the temperature of the deep space, 2.7K, as the temperature of the cold calibration source.

In the total-power microwave radiometer which utilizes the radio wave radiated from the deep space as its cold calibration source, the cold calibration source is used in combination with a reflector, which focuses the radio wave radiated from the deep space into the feed horn. A reflector, which is smaller than the one for focusing the radio wave radiated from the object under observation into the feed horn, is used for the cold calibration source, taking both the limitation for the size and weight of the apparatus to be mounted on the satellite and the coverage of the reflector for observation of the object into consideration. As a result, the reflector for the cold calibration source has larger antenna beam width, and thus its coverage includes not only the deep space but also the body of the microwave radiometer itself and the body of the satellite, on which the microwave radiometer is mounted. In such case, since the measurement data at the cold calibration source contains the radio waves other than those radiated from the deep space, the temperature of the cold calibration source must become different value from the temperature of the deep space, 2.7K. Therefore, if one employs 2.7K as the temperature of the cold calibration source, as has been done for conventional radiometers, he or she encounters the problem that the accuracy of the measurement for the object under observation is deteriorated because of the incorporation of the error into the temperature itself to be used as a standard.

In the prior arts for solving this problem of deterioration in accuracy, there is an approach where the measurement for the deep space is carried out by changing the attitude of the satellite so that the reflector, which is normally directed to the object under observation such as the earth, is directed to the deep space, and then the data measured thereby is used for calibrating the measurement data when the cold calibration source is measured. However, in order to do this operation, one has to abort primary observation for the object under observation because changing the attitude of the satellite is necessary for this approach. In addition, since the satellite has to be forced to invert its attitude by drastic control of the attitude, the approach is very dangerous to the operation of the satellite, and is detrimental to the lifetime of the satellite. As a result, such calibration of the measurement data by changing the attitude of the satellite is rarely carried out, such as a few times at most in a mission period of several years. In addition, some satellites do not have enough capability which enables one to carry out the approach. Furthermore, even if the approach is carried out, the temperature of the cold calibration source is calibrated only at the time when the approach is carried out, and is left uncalibrated throughout the rest of the whole mission period.

There is another approach for solving the problem of deterioration in accuracy in the prior art where the temperature of the cold calibration source is calibrated by the feedback from actual measurement of the temperature of the object under observation, such as a certain area of the ocean, by synchronizing the measurement with the measurement by the microwave radiometer (sea truth). However, since the area from which the data is retrieved at one measurement by the microwave radiometer is very large, from a few kilometers square to 100 kilometers square, it is rare that the whole area has a homogeneous temperature, and it is almost impossible to understand accurately how the radio wave radiated from the area is attenuated by the atmosphere until the radio wave reaches to the microwave radiometer on the orbit so that the calibration of the temperature of the cold calibration source by the feedback can be carried out. In addition, similarly to the aforementioned approach where the attitude of the satellite is changed, the feedback calibration by this approach can be rarely carried out. Thus, even with this approach, it is impossible to determine the temperature of the cold calibration source accurately.

SUMMARY OF THE INVENTION

Accordingly, it is an object of the present invention to solve the aforementioned problems in the prior calibration method using a cold calibration source, and the present invention provides a calibration method which makes it possible to determine the temperature of the cold calibration source and to calibrate radiometer frequently.

This object is achieved by the present invention having the following features. In one embodiment, the present invention is a method for calibrating a total-power microwave radiometer having a cold calibration source and a hot calibration source and measuring brightness temperature, the method comprises the steps of measuring the brightness temperature of the hot calibration source having a temperature of $T_{hot1}$ under conditions where the ambient temperature is constant; measuring the brightness temperature of the hot calibration source having a temperature of $T_{hot2}$ under conditions where the ambient temperature is constant, where $T_{hot1}$ and $T_{hot2}$ are different temperatures; and measuring the brightness temperature of the cold calibration source where the ambient temperature is constant; repeating a predetermined number of times at least one of the steps of measuring the brightness temperature of the hot calibration source having a temperature of $T_{hot1}$, measuring the brightness temperature of the hot calibration source having a temperature of $T_{hot2}$, and measuring the brightness temperature of the cold calibration source; calculating the standard deviation $\Delta T_{hot1}$ from the measured brightness temperatures of said hot calibration source having a temperature of $T_{hot1}$; calculating the standard deviation $\Delta T_{hot2}$ from the measured brightness temperatures of said hot calibration source having a temperature of $T_{hot2}$; calculating the standard deviation $\Delta T_{cold}$ from the measured brightness temperatures of said cold calibration source; and calibrating the total-power microwave radiometer by defining the brightness temperature of the cold calibration source according to the following equation:

$$T_{cold} = [(\Delta T_{hot1} - \Delta T_{cold})T_{hot2} - (\Delta T_{hot2} - \Delta T_{cold})T_{hot1}]/(\Delta T_{hot1} - \Delta T_{hot2}).$$

In another embodiment, the present invention is a method for calibrating a total-power microwave radiometer according to the above-described embodiment, wherein the ambient temperature is constant and the steps of measuring the brightness temperature of the hot calibration source having a temperature of $T_{hot1}$, measuring the brightness temperature of the hot calibration source having a temperature of $T_{hot2}$, and measuring the brightness temperature of the cold calibration source are carried out while the radiometer is under sunshine or under shade.

In general, the total-power microwave radiometer is used for a satellite, and the cold calibration source utilizes radio wave radiated from the deep space. In addition, the brightness temperature of the hot calibration source or the cold calibration source is usually measured by a receiver of the radiometer. Furthermore, the temperature of the receiver is usually the same as the temperature of the ambient surrounding the receiver.

Accordingly, yet another embodiment of the present invention is a method for calibrating a total-power microwave radiometer for a satellite having a cold calibration source which utilizes radio wave radiated from the deep space and a hot calibration source and measuring brightness temperature by a receiver, the method comprises the steps of measuring the brightness temperature of the hot calibration source having a temperature of $T_{hot1}$ with the receiver under conditions where the temperature of the receiver is constant; measuring the brightness temperature of the hot calibration source having a temperature of $T_{hot2}$ with the receiver under conditions where the temperature of the receiver is constant, where $T_{hot1}$ and $T_{hot2}$ are different temperatures; and measuring the brightness temperature of the cold calibration source with the receiver under conditions where the temperature of the receiver is constant; and said method further comprises the steps of repeating a predetermined number of times at least one of the steps of measuring the brightness temperature of the hot calibration source having a temperature of $T_{hot1}$, measuring the brightness temperature of the hot calibration source having a temperature of $T_{hot2}$, and measuring the brightness temperature of the cold calibration source; calculating the standard deviation $\Delta T_{hot1}$ from the measured brightness temperatures of said hot calibration source having a temperature of $T_{hot1}$; calculating the standard deviation $\Delta T_{hot2}$ from the measured brightness temperatures of said hot calibration source having a temperature of $T_{hot2}$; calculating the standard deviation $\Delta T_{cold}$ from the measured brightness temperatures of said cold calibration source; and calibrating the total-power microwave radiometer for a satellite by defining the brightness temperature of the cold calibration source according to the following equation:

$$T_{cold} = [(T_{hot1} - \Delta T_{cold})T_{hot2} - (\Delta T_{hot2} - \Delta T_{cold})T_{hot1}]/(\Delta T_{hot1} - \Delta T_{hot2}).$$

In another embodiment, the present invention is a method for calibrating a total-power microwave radiometer for a satellite according to the above-described embodiment, wherein the steps of measuring the brightness temperature of the hot calibration source having a temperature of $T_{hot1}$ with the receiver, measuring the brightness temperature of the hot calibration source having a temperature of $T_{hot2}$ with the receiver, and measuring the brightness temperature of the cold calibration source with the receiver are carried out while the satellite is under sunshine or under shade.

DESCRIPTION OF THE PREFERRED EMBODIMENT

Figure 1:
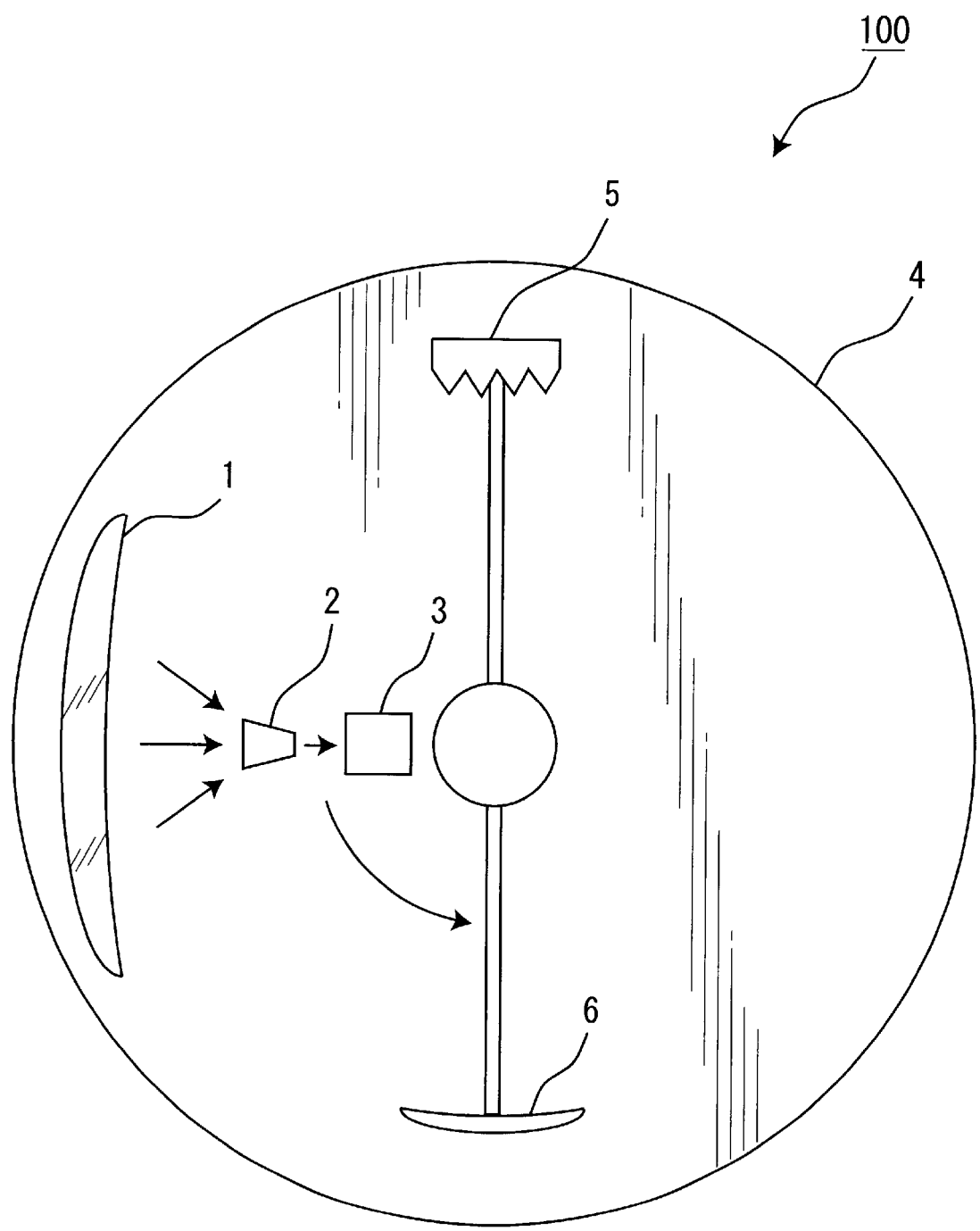
FIG. 1 is a block structural diagram showing the schematic structure of the microwave radiometer 100 of an embodiment of the present invention.

First of all, the equation for determining the temperature of the cold calibration source is induced as follows. In the microwave radiometer, when the temperature of the receiver is $T_{sys}$, the resolution (standard deviation) $\Delta T_{obs}$ at the time when the object under observation having a brightness temperature of $T_{obs}$ is observed is given as $$\Delta T_{obs} = \frac{T_{obs} + T_{sys}}{\sqrt{B\tau}} = a(T_{obs} + T_{sys}) \quad (1)$$

$$a = \frac{1}{\sqrt{B\tau}} \quad (2)$$

where

B=receiver band width $\tau$=integration time.

Applying the equation to the case where the observation is made for the hot calibration source having a temperature of $T_{hot}$ and for the cold calibration source having a temperature of $T_{cold}$ leads to the following temperature resolutions $\Delta T_{hot}$ and $\Delta T_{cold}$ at the time when each of the calibration sources is observed:

$$\Delta T_{hot} = a(T_{hot} + T_{sys}) \quad (3)$$

$$\Delta T_{cold} = a(T_{cold} + T_{sys}) \quad (4)$$

Here, suppose that the hot calibration source and the cold calibration source are observed under conditions where $T_{sys}$ is constant and the temperatures of the hot calibration source are $T_{hot1}$ and $T_{hot2}$, to find that the resolutions were $\Delta T_{hot1}$ and $\Delta T_{hot2}$ when the hot calibration was observed and the resolution was $\Delta T_{cold}$ when the cold calibration was observed. In this case, calculating $\Delta T_{hot1}-\Delta T_{cold}$ and $\Delta T_{hot2}-\Delta T_{cold}$ leads to the following equations:

$$\Delta T_{hot1}-\Delta T_{cold}=a(T_{hot1}+T_{sys})-a(T_{cold}+T_{sys})=a(T_{hot1}-T_{cold}) \quad (5)$$

$$\Delta T_{hot2}-\Delta T_{cold}=a(T_{hot2}+T_{sys})-a(T_{cold}+T_{sys})=a(T_{hot2}-T_{cold}). \quad (6)$$

From equations (5) and (6), the temperature of the cold calibration source $T_{cold}$ is expressed by the following equation:

$$T_{cold}=[(\Delta T_{hot1}-\Delta T_{cold})T_{hot2}-(\Delta T_{hot2}-\Delta T_{cold})T_{hot1}]/(\Delta T_{hot1}-\Delta T_{hot2}). \quad (7)$$

Thus, it can be achieved to decide the temperature of the cold calibration source $T_{cold}$, and to calibrate the radiometer by using this value.

The structure of the total-power microwave radiometer 100 of an embodiment of the present invention for a satellite (hereinafter called "microwave radiometer 100") will be discussed in the following. FIG. 1 is a general schematic block structural diagram of the microwave radiometer 100. Microwave radiometer 100 comprises reflector 1, feed horn 2, receiver 3, rotator 4, hot calibration source 5 and cold calibration source 6. Reflector 1 convergently reflects the radio waves radiated from an object under observation and focuses them into feed horn 2. Feed horn 2 has a function to collect radio waves. Receiver 3 detects the radio waves collected by feed horn 2, and outputs video signals. The output from receiver 3 is retrieved on the ground via a transmitter on the satellite, and then processed. Rotator 4 moves so that reflector 1, feed horn 2 and receiver 3 are rotated. Hot calibration source 5 generally comprises a radio wave absorber whose temperature is controlled by a heater and such, and its position is fixed. Cold calibration source 6 is a reflector, which focuses the radio wave radiated from the deep space into feed horn 2. Generally, a parabolic antenna is used for it, and its position is fixed.

Figure 2:
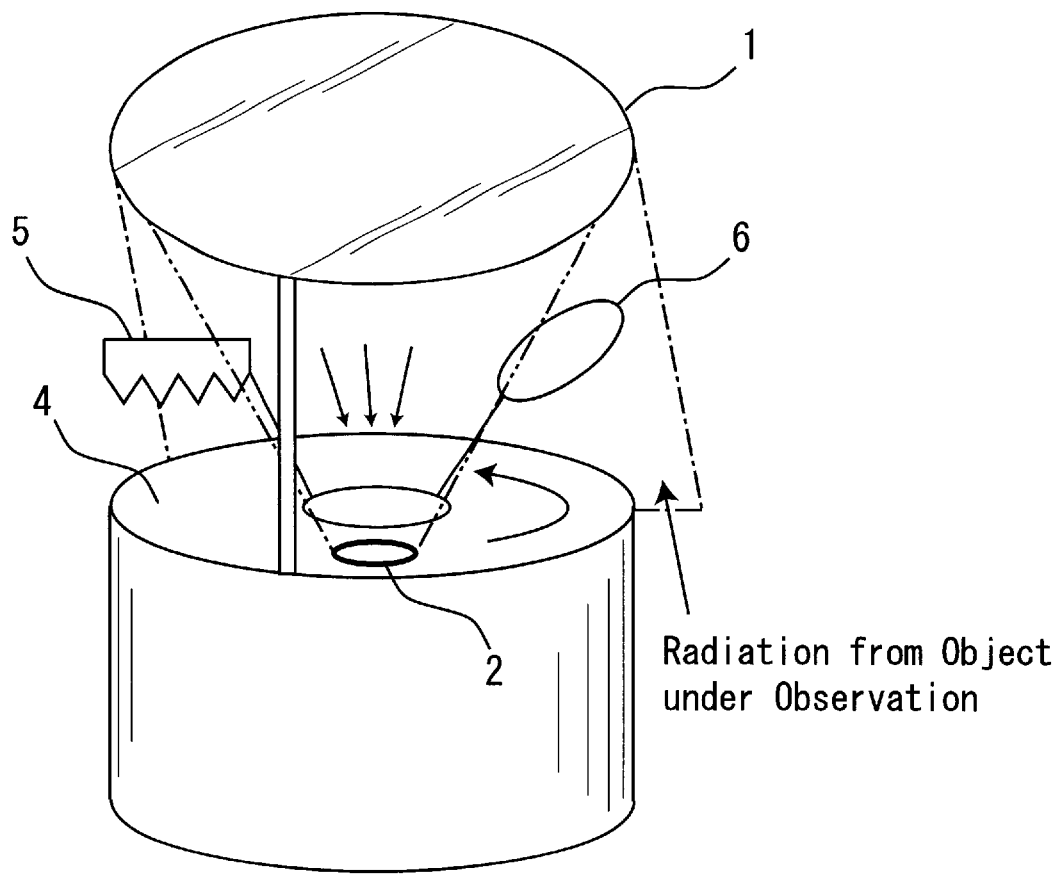
FIG. 2 is a schematic illustrating the operation for measuring the brightness temperature of the object under observation in the total-power microwave radiometer.
Figure 3:
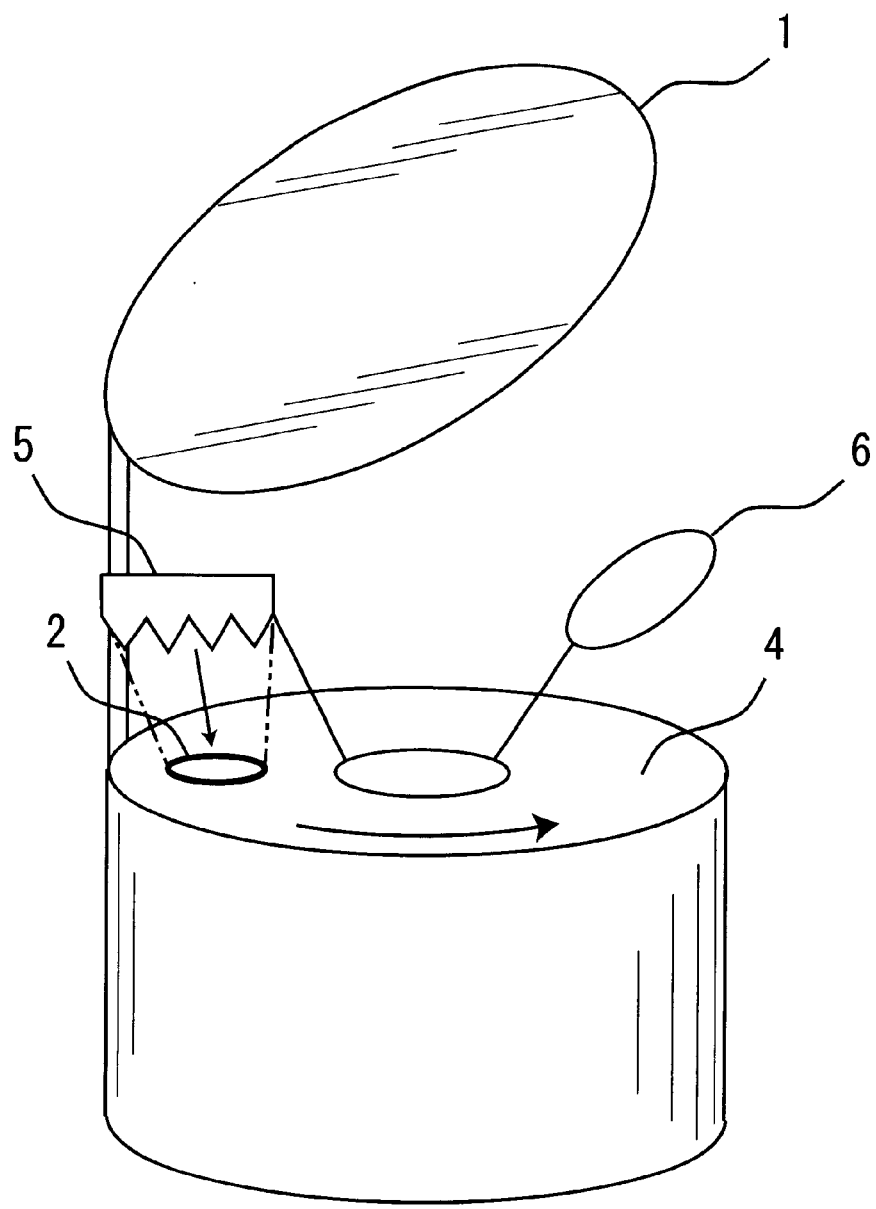
FIG. 3 is a schematic illustrating the operation for measuring the brightness temperature of the hot calibration source in the total-power microwave radiometer.
Figure 4:
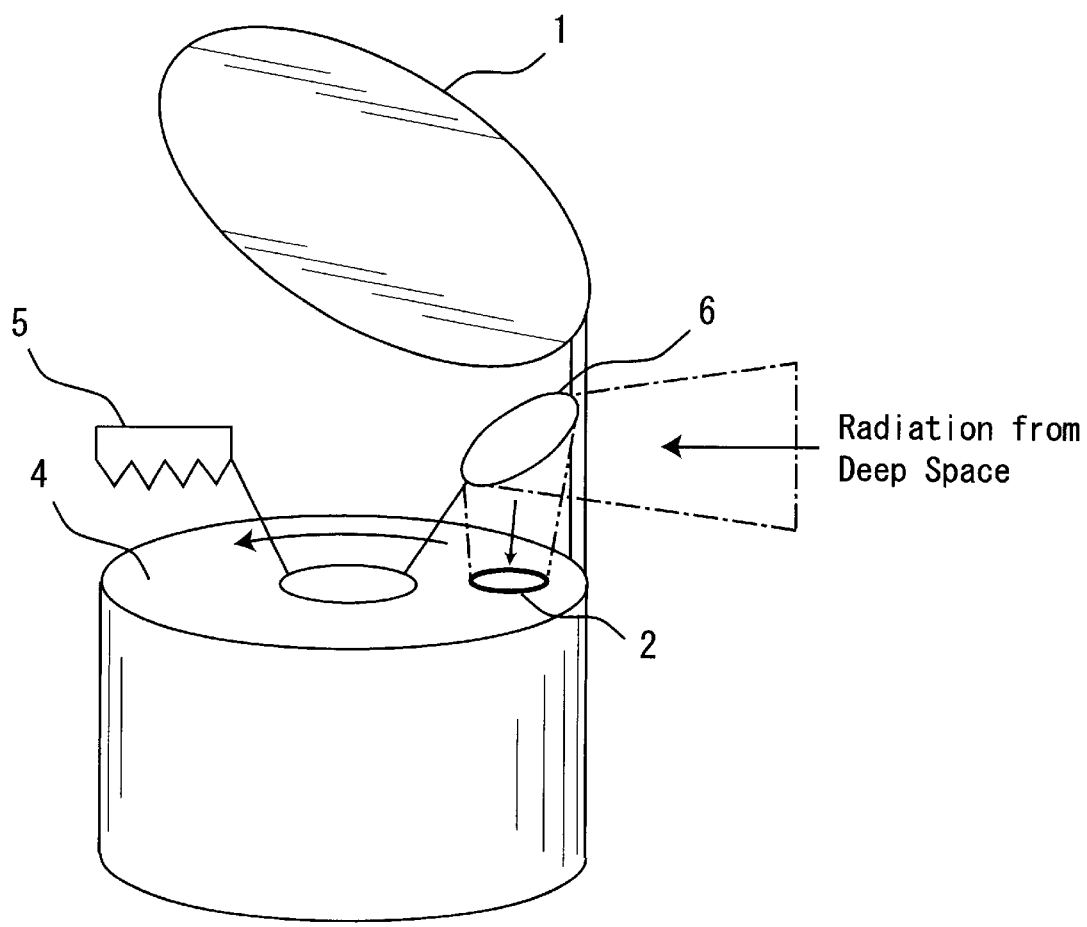
FIG. 4 is a schematic illustrating the operation for measuring the brightness temperature of the cold calibration source in the total-power microwave radiometer.

The procedure for calibrating microwave radiometer 100 will be discussed next. FIGS. 2, 3 and 4 are schematics illustrating the operation in the total-power microwave radiometer for measuring the brightness temperatures of the object under observation, the hot calibration source and the cold calibration source, respectively. Under conditions where $T_{sys}$ is constant, the brightness temperature of the object under observation, the hot calibration source and the cold calibration source are measured. As illustrated in FIGS. 2 to 4, while reflector 1 and feed horn 2 are rotated by rotator 4 once, hot calibration source 5 and cold calibration source 6 are positioned between reflector 1 and feed horn 2. In the situation illustrated in FIG. 2, reflector 1 reflects the radio waves radiated from the object under observation and leads them to feed horn 2, and the brightness temperatures of the object under observation is measured by receiver 3. In the situation illustrated in FIG. 3, hot calibration source 5 is positioned between reflector 1 and feed horn 2, the radiation therefrom is led to feed horn 2, and the brightness temperature of hot calibration source 5 is measured by receiver 3. In this case, the measurement of the brightness temperature of hot calibration source 5 is accomplished by repeating the measurement several times with the actual temperature of hot calibration source 5 kept at $T_{hot1}$, and repeating the measurement several times with the temperature of hot calibration source 5 kept at $T_{hot2}$ ($T_{hot1} \neq T_{hot2}$). In this embodiment, the measurement is carried out by choosing the values of $T_{hot1}$ and $T_{hot2}$ as $T_{hot1}$=290K and $T_{hot2}$=310K. Here, it should be noted that $T_{hot1}$(=290K) and $T_{hot2}$ (=310K) are such values as can be measured accurately because the temperature of hot calibration source 5 can be measured directly, and that $T_{cold}$ is such a value as cannot be measured accurately because the radiation from the deep space cannot be simulated accurately by cold calibration source 6. Accordingly, the present invention provides a method which enables one to decide such $T_{cold}$ accurately from the values actually measured (and their standard deviations). In the situation illustrated in FIG. 4, cold calibration source 6 is positioned between reflector 1 and feed horn 2, the radiation therefrom is led to feed horn 2, and the brightness temperature of cold calibration source 6 is measured by receiver 3. In this case, the measurement of the brightness temperature of cold calibration source 6 is repeated several times. After the repetition of the measurements, the standard deviation of the brightness temperature measured for each of the objects, $\Delta T_{hot1}$, $\Delta T_{hot2}$ and $\Delta T_{cold}$, is calculated from the measured brightness temperatures of hot calibration source 5 having a temperature of $T_{hot1}$, the measured brightness temperatures of hot calibration source 5 having a temperature of $T_{hot2}$, and the measured brightness temperatures of cold calibration source 6, respectively. Here, based on the results obtained, assume that $\Delta T_{hot1}$ =0.344, $\Delta T_{hot2}$=0.357 and $\Delta T_{cold}$=0.017. Assigning these values to equation (7):

$$T_{cold}=[(\Delta T_{hot1}-\Delta T_{cold})T_{hot2}-(\Delta T_{hot2}-\Delta T_{cold})T_{hot1}]/(\Delta T_{hot1}-\Delta T_{hot2}).$$

gives $T_{cold}$=14.3K, and thus $T_{cold}$ can be obtained from $T_{hot1}$, $T_{hot2}$, $\Delta T_{hot1}$, $\Delta T_{hot2}$ and $\Delta T_{cold}$. This value, $T_{cold}$=14.3K, is almost identical to 15K, which is actual value of $T_{cold}$ obtained by the various methods aforementioned, and this fact shows that the value of $T_{cold}$ obtained according to the present invention is highly accurate. The present invention is significant because it enables one to decide $T_{cold}$ from an equation by using the standard deviations of measured values containing statistical error, $\Delta T_{hot1}$, $\Delta T_{hot2}$ and $\Delta T_{cold}$, as well as the values of $T_{hot1}$ and $T_{hot2}$, which can be measured accurately. In this connection, the more frequently the measurement for each of the objects is carried out, the closer the standard deviation calculated from the measured values gets to the true statistical standard deviation, and thus the more accurately one can decide $T_{cold}$. Here, for the measurement of the brightness temperature of hot calibration source 5 and cold calibration source 6, from the viewpoint of the operation of a satellite, there is no strict limitation about the frequency of the measurement, and in practice it is possible to increase the frequency of the measurement arbitrarily. As a result, $T_{cold}$ decided according to the present invention has highly accurate value. The above-described decision for the value of $T_{cold}$ is followed by the calibration of the microwave radiometer using the value. Specifically, calibration is made for the colder part of the relationship between the intensity of the radiated radio wave and the brightness temperature, by employing the average value of the intensity at the time when the brightness temperature of cold calibration source 6 is measured as the intensity corresponding to $T_{cold}$. It is also a significant advantage of the present invention that, since it allows one to measure the brightness temperatures of hot calibration source 5 (having a temperature of $T_{hot1}$ or $T_{hot2}$) and of cold calibration source 6 with the measurement of the object under observation continued, there is no adverse effect on the schedule of observation by the satellite, and the calibration can be carried out very frequently by calculating accurate $T_{cold}$.

According to the present invention, it is essential to carry out the steps of measurement under conditions where the ambient temperature is constant. Usually, the temperature of the receiver is the same as the temperature of the ambient surrounding the receiver. Therefore, if the steps of measurement are carried out under conditions where the ambient temperature is constant, the temperature of receiver 3, $T_{sys}$, is constant throughout the steps of measurement. However, it can be presumed that the temperature of receiver 3, $T_{sys}$, can change when a satellite goes from sunshine area to shaded area or from shaded area to sunshine area. In such a case, $T_{cold}$ can be decided accurately under conditions where the temperature of receiver 3, $T_{sys}$, is constant, by measuring the brightness temperatures of hot calibration source 5 having a temperature of $T_{hot1}$, hot calibration source 5 having a temperature of $T_{hot2}$ and cold calibration source 6 using receiver 3 while the satellite is under either sunshine or under shade. This method is advantageous because it enables one to decide the temperature of the cold calibration source even at the area adjoining to the border between sunshine and shade.

Thus, according to the present invention, $T_{cold}$, which does not accurately represent the radiation from the deep space and contains error, can be decided accurately from an equation by using the standard deviations of measured values containing statistical error, $\Delta T_{hot1}$, $\Delta T_{hot2}$ and $\Delta T_{cold}$, as well as the values of $T_{hot1}$ and $T_{hot2}$, which can be measured accurately, and thus calibration can be made for the colder part of the total-power microwave radiometer for a satellite with frequency and accuracy.

What is claimed is:

1. A method for calibrating a total-power microwave radiometer having a cold calibration source and a hot calibration source and measuring brightness temperature, the method comprises the steps of:

measuring the brightness temperature of the hot calibration source having a temperature of $T_{hot1}$ under conditions where the ambient temperature is constant;

measuring the brightness temperature of the hot calibration source having a temperature of $T_{hot2}$ under conditions where the ambient temperature is constant, where $T_{hot1}$ and $T_{hot2}$ are different temperatures;

measuring the brightness temperature of the cold calibration source where the ambient temperature is constant;

repeating a predetermined number of times at least one of said steps of measuring the brightness temperature of the hot calibration source having a temperature of $T_{hot1}$, measuring the brightness temperature of the hot calibration source having a temperature of $T_{hot2}$, and measuring the brightness temperature of the cold calibration source;

calculating the standard deviation $\Delta T_{hot1}$ from the measured brightness temperatures of said hot calibration source having a temperature of $T_{hot1}$;

calculating the standard deviation $\Delta T_{hot2}$ from the measured brightness temperatures of said hot calibration source having a temperature of $T_{hot2}$;

calculating the standard deviation $\Delta T_{cold}$ from the measured brightness temperatures of said cold calibration source; and calibrating the total-power microwave radiometer by defining the brightness temperature of the cold calibration source according to the following equation:

$$T_{cold}[(\Delta T_{hot1}-\Delta T_{cold})T_{hot2}-(\Delta T_{hot2}-\Delta T_{cold})T_{hot1}]/(\Delta T_{hot1}-\Delta T_{hot2}).$$

2. The method for calibrating a total-power microwave radiometer according to claim 1, wherein the ambient temperature is constant and said steps of measuring the brightness temperature of the hot calibration source having a temperature of $T_{hot1}$, measuring the brightness temperature of the hot calibration source having a temperature of $T_{hot2}$, and measuring the brightness temperature of the cold calibration source are carried out while the radiometer is under sunshine or under shade.

3. A method for calibrating a total-power microwave radiometer for a satellite having a cold calibration source which utilizes radio wave radiated from the deep space and a hot calibration source and measuring brightness temperature by a receiver, the method comprises the steps of:

measuring the brightness temperature of the hot calibration source having a temperature of $T_{hot1}$ with the receiver under conditions where the temperature of the receiver is constant;

measuring the brightness temperature of the hot calibration source having a temperature of $T_{hot2}$ with the receiver under conditions where the temperature of the receiver is constant, where $T_{hot1}$ and $T_{hot2}$ are different temperatures;

measuring the brightness temperature of the cold calibration source with the receiver under conditions where the temperature of the receiver is constant;

and said method further comprises the steps of:

repeating a predetermined number of times at least one of said steps of measuring the brightness temperature of the hot calibration source having a temperature of $T_{hot1}$, measuring the brightness temperature of the hot calibration source having a temperature of $T_{hot2}$, and measuring the brightness temperature of the cold calibration source;

calculating the standard deviation $\Delta T_{hot1}$ from the measured brightness temperatures of said hot calibration source having a temperature of $T_{hot1}$;

calculating the standard deviation $\Delta T_{hot2}$ from the measured brightness temperatures of said hot calibration source having a temperature of $T_{hot2}$;

calculating the standard deviation $\Delta T_{cold}$ from the measured brightness temperatures of said cold calibration source; and calibrating the total-power microwave radiometer for a satellite by defining the brightness temperature of the cold calibration source according to the following equation:

$$T_{cold}[(\Delta T_{hot1}-\Delta T_{cold})T_{hot2}-(\Delta T_{hot2}-\Delta T_{cold})T_{hot1}]/(\Delta T_{hot1}-\Delta T_{hot2}).$$

4. The method for calibrating a total-power microwave radiometer for a satellite according to claim 3, wherein said steps of measuring the brightness temperature of the hot calibration source having a temperature of $T_{hot1}$ with the receiver, measuring the brightness temperature of the hot calibration source having a temperature of $T_{hot2}$ with the receiver, and measuring the brightness temperature of the cold calibration source with the receiver are carried out while the satellite is under sunshine or under shade.

* * * * *